Feb. 16, 1926. 1,573,275
J. L. PRICE
BRAKE OPERATING CONNECTION
Filed July 16, 1925
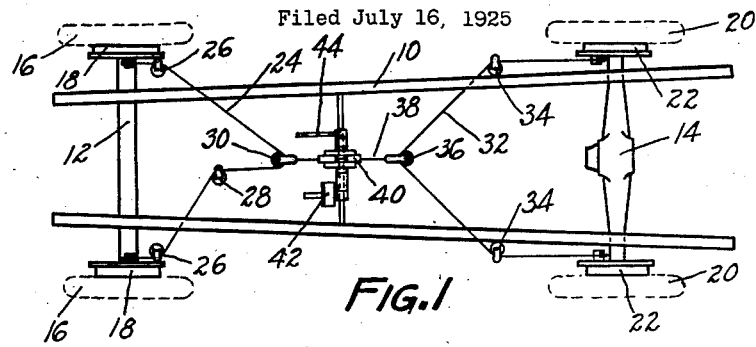
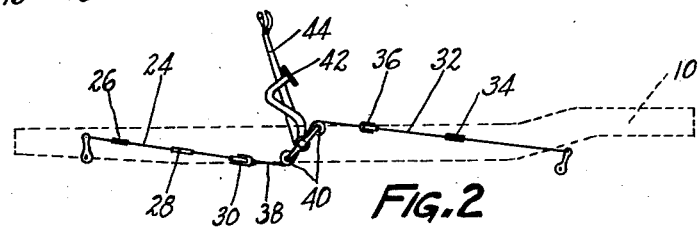
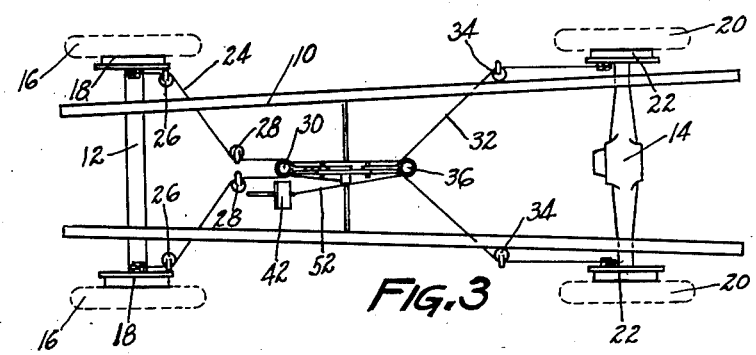
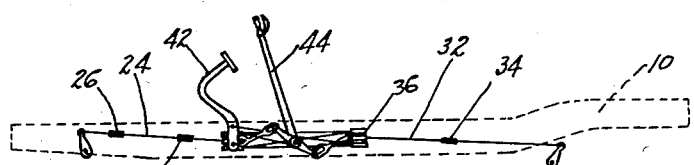
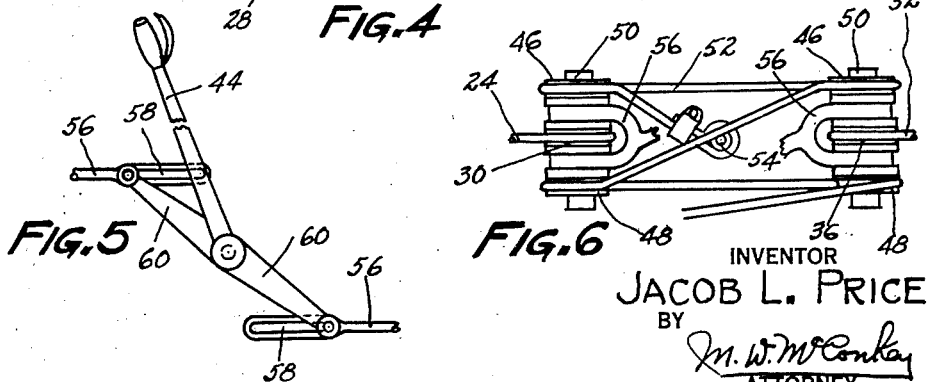
INVENTOR
JACOB L. PRICE
BY
M. W. McConkey
ATTORNEY Patented Feb. 16, 1926.

1,573,275

UNITED STATES PATENT OFFICE.

JACOB L. PRICE, OF CHICAGO, ILLINOIS, ASSIGNOR TO BENDIX BRAKE COMPANY, A CORPORATION OF ILLINOIS.

BRAKE-OPERATING CONNECTION.

Application filed July 16, 1925. Serial No. 43,933.

*To all whom it may concern:*

Be it known that I, JACOB L. PRICE, a citizen of the United States, residing in Chicago, in the county of Cook and State of Illinois, have invented a certain new and useful Improvement in Brake-Operating Connections (file M28), of which the following is a specification.

This invention relates to brakes, and is illustrated as embodied in an automobile chassis having brakes on all four wheels. An object of the invention is to provide simple operating connections, by the use of cables or equivalent operating connections, preferably tensioned by power-multiplying means such as a block-and-tackle.

Another object of the invention is to guard against accident, by arranging that the emergency lever or its equivalent shall operate the brakes through non-equalizing connections, so that even if one cable breaks the other brakes can be applied.

The above and other objects and features of the invention, including various novel combinations of parts and desirable particular constructions, will be apparent from the following description of two illustrative embodiments shown in the accompanying drawing, in which:

Fig. 1 is a top plan view of a chassis, showing one modification;

Fig. 2 is a side elevation of the brake-applying connections of Fig. 1, with the chassis frame shown in dotted lines;

Fig. 3 is a top plan view of a chassis, showing a second modification;

Fig. 4 is a side elevation of the brake-applying connections of Fig. 3, with the chassis frame shown in dotted lines;

Fig. 5 is a side elevation of the emergency lever hookup in Fig. 4, but with the brakes applied by the service pedal; and Fig. 6 is a side elevation on a larger scale of part of the connections.

Each chassis includes a frame 10, supported by springs (not shown) on a front axle 12 and a rear axle 14. The front wheels 16 have brakes 18 and the rear wheels 20 have brakes 22.

The front brakes 18 are operated by a continuous cable 24, or an equivalent tension member, passing over guide pulleys 26 swivelling with the wheels and one or more guide pulleys 28 on the frame, and tensioned to apply the brakes, and to equalize the pressure on the brakes, by movement of a pulley 30. Pulleys 28 are guides for the purpose of providing clearance for parts of the chassis which form no part of my invention and which are therefore not shown in the drawings.

The rear brakes 22 are applied by a continuous cable 32, or an equivalent tension member, passing over guide pulleys 34, and tensioned to apply the brakes, and to equalize the braking pressure, by a pulley 36.

In the arrangement of Figs. 1 and 2, pulleys 30 and 36 are drawn toward each other, to apply the brakes, by a flexible tension element 38 secured at its ends to the two pulleys 30 and 36, and passing over two pulleys 40 carried by a frame rocked either by the service pedal 42 or by the emergency lever 44.

In the arrangement of Figs. 3–6 (see Fig. 6), a pair of pulleys 46 and 48 are arranged respectively above and below each of the pulleys 30 and 36, on the same spindle 50, and a cable or the like 52 is fastened at one end to the frame 10 at 54 and at the other end to the service pedal 42 and is threaded around the pulleys 46 and 48 to form with those pulleys a power-multiplying block-and-tackle.

In this modification, the emergency lever 44 is mounted separately from the pedal, and is separately connected to pulleys 30 and 36 by links 56. As appears in Figs. 6, each link 56 is forked at its end to form a pair of arms straddling one of the pulleys 30 or 36, to centralize the pull, the arms having openings through which spindles 50 pass, so that the links pull directly on the spindles. At their opposite ends, the links have slots 58 to embrace pins or rollers carried by oppositely-extending arms 60 rocked by lever 44. Slots 58 allow lost motion, when the service pedal is used, as in Fig. 5.

It will be seen that in this arrangement, depression of pedal 42 equalizes the front brakes against the rear brakes, whereas lever 44 operates the brakes without equalization, so that one pair of brakes can be applied even if one of the cables 24 or 32 is broken.

While two illustrative embodiments have been described in detail, it is not my intention to limit the scope of the invention to those particular embodiments, or otherwise than by the terms of the appended claims.

I claim:

1. A vehicle having, in combination, a pair of front brakes, a pair of rear brakes, a continuous tension element arranged to operate each pair of brakes, a pulley engaging each tension element, a block and tackle connecting the pulleys, and means for operating the block and tackle to draw the pulleys toward each other to apply all four brakes.

2. A vehicle having, in combination, a pair of front brakes, a pair of rear brakes, a continuous tension element arranged to operate each pair of brakes, a pulley engaging each tension element, a service pedal, an emergency lever, and connections operated either by the pedal or lever for drawing the pulleys toward each other to apply all four brakes.

3. A vehicle having, in combination, two pairs of brakes, two separate connections, each operating one pair of brakes, two driver-controlled brake-applying devices, an equalizing device operated by one brake-applying device to operate both connections to apply all four brakes with one pair equalized against the other pair, and non-equalizing means operated by the other brake-applying device to operate both connections without equalizing the one pair of brakes against the other pair.

4. A vehicle having, in combination, front and rear pairs of brakes, two separate connections, each operating one pair of brakes, a service pedal, an emergency lever, an equalizing device operated by the service pedal to operate both connections to apply all four brakes with the front pair equalized against the rear pair, and non-equalizing means operated by the emergency lever to operate both connections without equalizing the front pair of brakes against the rear pair.

5. A vehicle having, in combination, two pairs of brakes, equalizing connections for applying each pair of brakes and equalizing one of each pair against the other, equalizing means including a service brake pedal for operating the two connections and equalizing one pair of brakes against the other pair, and non-equalizing means including an emergency lever for operating the two connections without equalization of the one pair against the other pair.

6. A vehicle having, in combination, two pairs of brakes, a cable and pulley for applying each pair of brakes and equalizing one of each pair against the other, equalizing means including a service brake pedal for drawing the two pulleys toward each other to apply the brakes and equalizing one pair of brakes against the other pair, and non-equalizing means to apply the four brakes without equalization of the one pair against the other pair.

7. A vehicle having, in combination, two pairs of brakes, a cable and pulley for applying each pair of brakes and equalizing one of each pair against the other, equalizing means including a service brake pedal for drawing the two pulleys toward each other to apply the brakes, and equalize one pair of brakes against the other pair, and non-equalizing means including an emergency lever and a pair of lost-motion connections from the lever to the two pulleys for drawing the two pulleys toward each other to apply the brakes without equalization of the one pair against the other pair.

8. A vehicle having, in combination, two sets of brakes and a brake-applying connection for each set, a pulley-block arranged to operate each connection, an operating lever, a stationary part, and a cable connected at its ends to said part and lever and forming with the blocks a power-multiplying block-and-tackle operated by the lever.

9. A vehicle having, in combination, two sets of brakes and brake applying connection for each set, a pulley block arranged to operate each connection, an operating lever, a stationary part, a cable connected at its ends to said part and lever and forming with the blocks a power-multiplying block-and-tackle operated by the lever, a lost-motion link connected to each block, and another operating lever for operating the links.

10. A vehicle having, in combination, a set of two brakes, a cable arranged at its opposite ends to operate the two brakes, a pulley engaged by the cable and movable to tension the cable, a pair of pulleys on opposite sides of said first pulley and a spindle for the three pulleys, and a brake-applying power-multiplying block-and-tackle including said pair of pulleys.

11. A vehicle having, in combination, a set of two brakes, a cable arranged at its opposite ends to operate the two brakes, a pulley engaged by the cable and movable to tension the cable, a pair of pulleys on opposite sides of said first pulley and a spindle for the three pulleys, a brake-applying power-multiplying block-and-tackle including said pair of pulleys, and an operating device engaging the spindle on opposite sides of the first pulley to apply the brakes independently of the block-and-tackle.

12. A vehicle having a pair of swivelled wheels, each having a brake, and, in combination therewith, a pulley swivelling with each wheel, an applying device for each brake in line with the corresponding pulley, a cable connected at its ends to said devices and guided by the pulleys, tensioning means including a movable pulley engaging an intermediate part of the cable, and selectively operable connections for moving the third pulley to apply the brake.

In testimony whereof I have hereunto signed my name.

JACOB L. PRICE.